Sept. 17, 1935.   R. C. SPRAGUE   2,014,398
ELECTRICAL CONDENSER
Filed Jan. 9, 1929   3 Sheets-Sheet 1

INVENTOR.
Robert C. Sprague.
By Roberts, Cushman & Woodbury
ATTORNEYS.

Sept. 17, 1935.  R. C. SPRAGUE  2,014,398
ELECTRICAL CONDENSER
Filed Jan. 9, 1929   3 Sheets-Sheet 2

INVENTOR.
Robert C. Sprague
by Roberts, Cushman & Woodbury
ATTORNEYS.

Sept. 17, 1935.   R. C. SPRAGUE   2,014,398
ELECTRICAL CONDENSER
Filed Jan. 9, 1929   3 Sheets-Sheet 3

INVENTOR.
Robert C. Sprague
by Roberts, Cushman & Woodbury
ATTORNEYS.

Patented Sept. 17, 1935

2,014,398

UNITED STATES PATENT OFFICE 2,014,398

ELECTRICAL CONDENSER

Robert C. Sprague, Quincy, Mass., assignor to Sprague Specialties Co., North Adams, Mass., a corporation of Massachusetts Application January 9, 1929, Serial No. 331,292

2 Claims. (Cl. 175—41)

The present invention relates to electrical condensers, and more particularly to condensers whose dielectric comprises or is impregnated with paraffin or other suitable material.

Condensers of this type, which consist as a rule of two strips of tin foil or other thin metal serving as electrodes, and of two or more intermediate strips of impregnated paper forming the dielectric, and which are usually wound into a compact form, are well known and have been manufactured for a great many years. While initially, due to the improvement in the material and treatment of the dielectric and in the manufacturing process of the condenser in general, some increase in the dielectric strength has been obtained, no further progress has been made in recent years, and apparently the limit of the dielectric strength determined by the physical properties of this type of dielectric has been reached.

The object of my invention is to provide for this type of condenser a dielectric possessing a dielectric strength, i. e., a break-down voltage gradient, of an entirely different order of magnitude from that of the dielectric of condensers now known in the art.

A further object of my invention is to provide a method whereby such condensers can be manufactured economically and with a high degree of uniformity.

I have now found that by applying on or inserting between the layers of impregnated paper very thin layers of paraffin, or like material, the break-down voltage of the dielectric is greatly increased without substantially increasing its thickness.

Through insertion of thin layers of suitable material—which for convenience I shall hereafter designate as paraffin—between the layers of impregnated paper, a multiple-layer dielectric with different potential gradients across the different dielectrics is obtained. Without going into the somewhat complicated formulas determining the voltage distribution for the individual layers of a multiple-layer dielectric, it suffices to point out that in the case of direct current the pro rata voltage taken up by each dielectric layer is proportionate to its thickness and to its specific insulating resistance; that in the case of alternating current—assuming that there is no leakage current, i. e., that the insulation resistance of the dielectrics is infinite—the voltage is distributed in proportion to the thickness of the dielectric layers and in inverse proportion to their dielectric constant; and that in the case of alternating current with measurable leakage— or conduction current, the voltage gradient depends upon the relative value of the displacement current and conduction current, all this being well known in the art.

Because of the higher resistivity and lower dielectric constant of paraffin compared with paraffin impregnated paper, the paraffin layer will have a higher voltage gradient for both direct and alternating current, i. e., it will take up a larger portion of the applied voltage per unit of thickness than the paraffined paper.

But aside from the reasons just pointed out, there is a further reason why the interposed paraffin layers take up a larger portion of the applied voltage than would be their share if the dielectric were homogeneous and distributed proportionally to the relative thicknesses of the paraffin and the paraffined paper layers.

Paper at its best contains a relatively large number of minute holes and of conductive particles constituting spots of very low or no dielectric strength. Impregnation only partly eliminates the influence of such "weak spots", and on this account a single layer of paper is generally inadequate to form the dielectric of a condenser even for the lower voltages, and two layers have to be used. (Two layers, as a rule, suffice for the lower voltages as with better grade paper coincidence of weak spots in two layers is extremely rare.) It is evident that the break-down voltage of the whole condenser is not greater than the break-down voltage of the dielectric at its weakest point, i. e., it is limited to the break-down voltage of a single layer of paper.

For higher voltages three or more layers of paper are used, but again one less than the total number of layers determines the resultant breakdown voltage of the condenser.

In the condensers embodying my invention wherever a weak spot occurs in one of the layers of paper, a large portion of the pro rata voltage of this paper is taken over by the intermediate layers of paraffin.

From the above it appears that by providing for intermediate layers of paraffin I reduce the dielectric stress on the paraffined paper layers in a much greater proportion than I increase the total thickness of the combined dielectric layer between the two plates of the condenser.

From the same considerations it also appears that the dielectric stress on the thin paraffin layer is of a very high order. However, it has been long known that for various dielectrics, the dielectric strength or break-down voltage per unit of thickness rapidly increases with decreasing thickness, a typical curve being given in Fig. 3. It has been also found that this effect may be very pronounced in the lower range of thicknesses below a few thousandths of an inch. The paraffin layers applied or inserted by my method are as a rule very thin—for instance, a thickness of .00009" to .00013" has been found very suitable—and possess a dielectric strength of unusual magnitude and are well adapted to stand up under the high dielectric stresses to which they are subjected due to the heretofore explained uneven distribution of the voltage across the combined dielectric.

Thus, by providing a method whereby thin and uniform layers of paraffin or like material are applied or interposed between layers of paraffined or otherwise impregnated paper and by suitably dimensioning the relative thickness of the paraffin and the paper layers, I have succeeded in producing condensers of which the break-down voltage per mill thickness of dielectric is of a heretofore unknown order of magnitude.

In the accompanying drawings of this specification,

Figure 5:
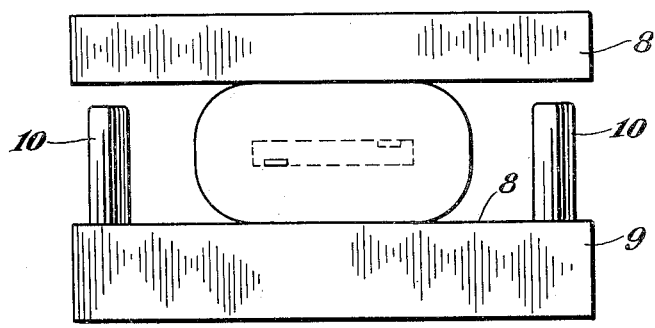
Figure 6:
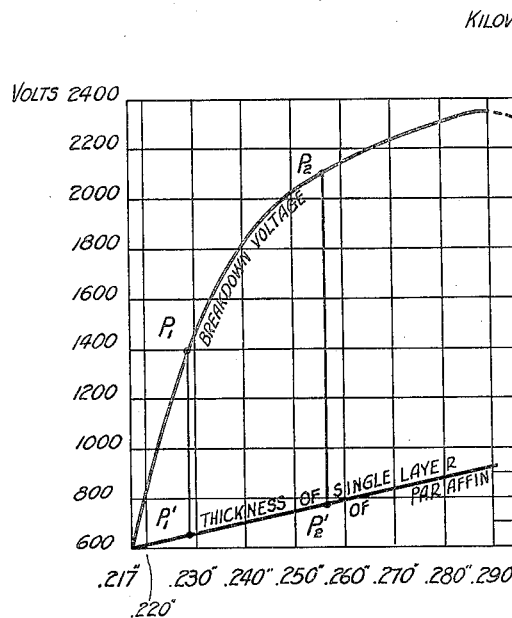
Figure 7:
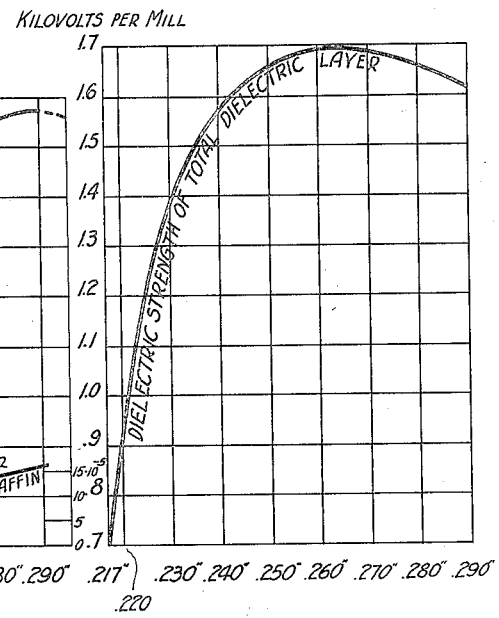
Figure 8:
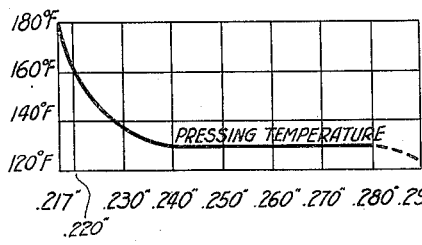
Figure 9:
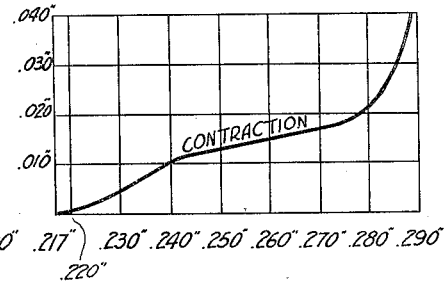

Fig. 5 is a side elevation, partly in section, showing the method of compressing a condenser to a standard thickness; and Figs. 6 to 9 are curves showing the test results made on one type of condenser embodying my invention whereby the lower curve of Fig. 6 gives the relation between the individual thickness of the paraffin layers and the total thickness of the condensers, and the upper curve the break-down voltage of these condensers in dependence of their total thickness; and the curves of Figs. 7, 8 and 9 give the dielectric strength of the dielectric layer between the two plates, the most suitable pressing temperature and the contraction of the condensers when cooled down from the pressing temperature respectively, all in dependence of the total thickness of the condensers.

Figure 1:
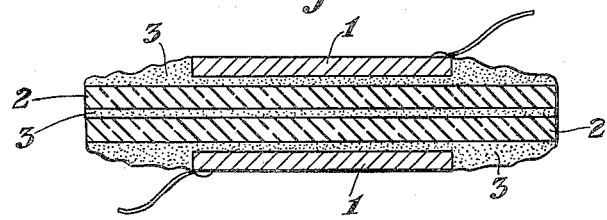
Fig. 1 is a section showing diagrammatically a two-plate condenser embodying one form of my invention.

Referring now to Fig. 1, which is a schematic representation of one form of the invention as applied to a two-plate condenser, we find two conducting plates I—I which are shown to be separated by five layers of dielectric material, of which two layers 2—2 are formed of paraffined paper and three layers 3 of paraffin. While in this and in the following illustrations of my invention I have shown five dielectric layers between the two conducting plates, of which I have referred to two as paraffined paper layers and to three as paraffin layers, I wish it to be well understood that my invention is in no way limited to either the number of layers nor to the material here specified. Nor should the illustrated thickness of the various layers be regarded as indicative of their actual or relative thickness.

Figure 2:
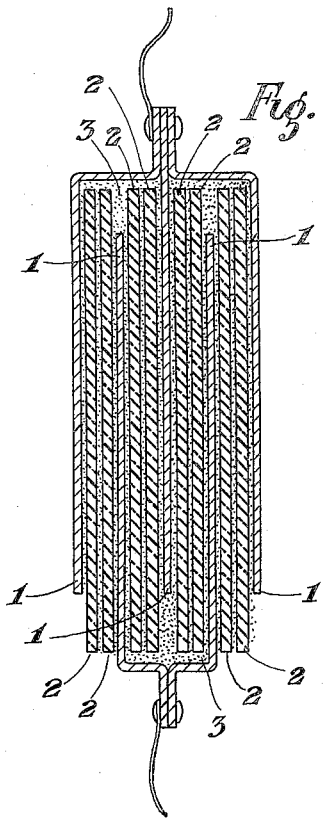
Fig. 2 is a section similar to Fig. 1 illustrating a multiple-plate condenser.
Figure 3:
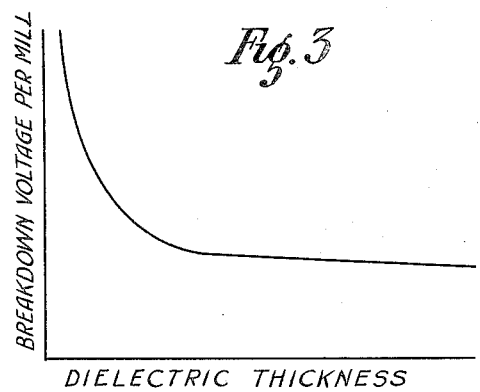
Fig. 3 is a typical curve for a dielectric showing the increase in break-down voltage per mill with decreasing thickness.

The embodiment illustrated in Fig. 2 is similar to that shown in Fig. 1, except that it relates to a multiple-plate condenser instead of a two-plate condenser.

Figure 4:
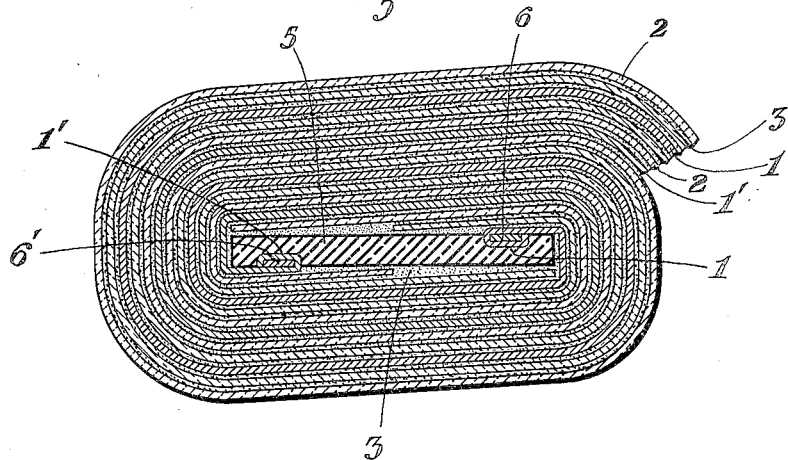
Fig. 4 is a section of a wound type condenser embodying my invention.

Fig. 4 shows the invention as applied to a condenser of the type disclosed in my copending application Serial No. 135,342, filed September 14, 1926.

The condenser is provided with a base 5, preferably of fiber or similar material, in the recesses of which are embedded leads or electrodes 6 and 6' of copper or other suitable conductive material. Connected with each of the leads 6 and 6' are sheets of metal foil I and I', respectively; the foils are preferably wound around the leads or secured thereto by adhesive material or other means. Interposed between the metal foils I and I' are, similarly to Figs. 1 and 2, five dielectric layers, namely, two layers of paraffined paper 2 and three layers of paraffin 3. The two metal foils with the intervening dielectric layers are wound into a coil and provided with a covering sheet 7 to form a compact condenser.

In the first stages of the manufacturing of condensers which embody my invention, various practices may be followed. Assuming again that my invention is to be applied to paraffin impregnated paper condensers of comparatively large capacities, then, according to well known practice, the metal foil and paper layers may be wound into a coil and this assembly impregnated with paraffin—by a vacuum process if so desired—or, for instance, as suggested in my above referred to application Serial No. 135,342, one layer of metal foil and one or more layers of impregnated paper may be united into a composite strip by means of paraffin or other material, and two such composite strips wound together to form the condenser.

It should be noted that in winding these condensers a sufficient slack should be provided to permit interposition of the paraffin layers.

Irrespective of the exact process employed in the first manufacturing stages, to form the thin dielectric layers I prefer to immerse the condenser assemblies in a bath consisting of the proposed dielectric, the temperature of this bath being considerably above the melting point of the dielectric. In the case of paraffined paper condensers and with paraffin as the dielectric for the thin interposed layers, a suitable temperature if from 260° to 280° F. and the regular impregnating process may take the place of this bath.

After this first bath, the condensers are placed in a second bath in which the dielectric is heated only slightly above its melting point. In the case of paraffin, for instance, a suitable temperature of this bath is from 130° to 180° F., depending on the thickness of paraffin layers to be interposed. The condensers are left in this second bath for a short time—preferably a few minutes only. Instead of using two separate baths, namely, one of a higher and another of a lower temperature, it is feasible to use a single bath and after sufficient impregnation at the higher temperature the bath is cooled down to the lower temperature.

Upon removal of the condensers from the second bath they are placed immediately between the plates 8 of a suitable press 9, as illustrated in Fig. 5. The plates are provided with stops 10 so that the condenser, instead of being fully compressed, is compressed to a predetermined thickness, whereby only a part of the dielectric is squeezed out, leaving thin layers of substantial and predetermined thickness between the impregnated paper layers.

In the case of paraffin-paper condensers, I prefer to interpose paraffin layers of about .00009" to .00013", although good results were obtained with both thicker and thinner layers.

These layers are found to be quite uniform in thickness and in dielectric strength throughout the whole condenser. By varying the thickness to which the whole condenser is compressed, the thickness of the interposed paraffin layers is correspondingly varied. As has been previously pointed out, the break-down voltage of the condenser sharply increases through the insertion of the thin dielectric layers. That this increase is obtained without an equivalent increase in the total thickness of the dielectric layer is clearly shown from comparative tests made on condensers with and without interposed paraffin layers.

Figs. 6 to 9 give the results of a series of tests made on one type of condenser using two layers of .0005" thick paper between .0003" thick aluminum foil plates. The condensers were wound without central core and had 40 turns; they were covered with a single wrapper of bond paper.

Condensers as above specified were made up both according to standard practice as well as by applying my invention. Paraffin was used as impregnating medium, and in the case of the condensers embodying my invention also as the medium constituting the thin intermediate dielectric layers.

The condensers made up in the usual way, namely, fully compressed so that the paper layers contact with each other and with the aluminum foil, have a total thickness determined by the sum of the thicknesses of the paper and aluminum foil layers. As each turn comprises four layers of paper and two layers of aluminum, and as the double thickness of these six layers constitute the total thickness of a turn, the thickness of a turn is equal to 2 (4×.0005" plus 2×.0003")=.0052", and the thickness of 40 turns is equal to 40×.0052"=.208". With a wrapper thickness of .009", the total thickness of the fully compressed condensers was .217".

The alternating current break-down voltage of these condensers was determined and found to be in average about 700 volts.

The condensers embodying my invention were made up with interposed paraffin layers varying in thickness from 0 to .000152" per layer. As there are six interposed paraffin layers per turn and 40 turns, and the total thickness of the condenser determined by the double thickness of these turns, the added thickness of the condenser is 480 times the thickness of the individual paraffin layer. The total thickness of the condensers of these tests ranged, therefore, from .217" to .290", the first value corresponding to the fully compressed condensers, the second to condensers having interposed layers of paraffin of .000152" thickness.

The lower curve of Fig. 6 gives, designated as thickness of single layer of paraffin, the values of the thickness of the intermediate paraffin layers corresponding to the varying total thickness of the condenser. The total thicknesses are the abscissae and the thicknesses of the individual layers are the ordinates, the scale for the latter being on the right-hand side of the figure.

The break-down voltages of the condensers having interposed paraffin layers of varying thicknesses were determined and the results of these tests plotted in the upper curve of Fig. 6, designated as break-down voltage. The left-hand scale of this figure corresponds to this curve.

It appears from this curve that the break-down voltage of these condensers rapidly increases with the thickness of the interposed paraffin layers from its lowest value of 700 volts, corresponding to the fully compressed or standard make condensers. For instance, at a total thickness of .227" the break-down voltage is 1400 volts, and at a total thickness of .258" the break-down voltage is 2100 volts; the corresponding thicknesses of the individual paraffin layers are .000025" and .000085", respectively. It also appears that the maximum break-down voltage is reached with a total thickness of about .288". Beyond this point the curve slopes down as indicated in dotted lines.

The great advantage obtained by my invention is directly apparent from this curve, as with a slight increase in the total thickness of the condenser an increase of the break-down voltage of extraordinary magnitude is attained. While the slightly greater thickness of the dielectric layer somewhat decreases the capacity of my condenser compared with fully compressed condensers, this decrease is small and as will appear, is more than compensated for.

Curve 7 gives the dielectric strength, i. e., the break-down voltage per mill thickness for the total dielectric layer between the two plates of the condenser. The general character of this curve is similar to that of the break-down voltage curve of Fig. 6. It emphasizes to a still greater extent the relative merit of the thin paraffin layers and also indicates that the dielectric strength of these layers per unit thickness decreases with increasing thickness. From curve 7 it appears that the dielectric strength of the total dielectric layer, which is approximately .67 kilovolt per mill in the case of a fully compressed condenser, increases to a maximum value of about 1.68 kilovolts per mill in the case of condensers of .260" total thickness and slightly decreases thereafter.

Fig. 8 gives the most suitable pressing temperature for various total thicknesses of the condensers. As appears from this curve, the thinner the desired layers, the higher the required pressing temperature and vice versa. It also appears that for the thicker layers (above a total condenser thickness of .240"), the proper pressing temperature is only slightly above the solidification point of the paraffin. Still thicker paraffin layers would require further reduction of the pressing temperature, with such increase in the viscosity of the paraffin as to make it difficult to obtain uniform layers.

Due to contraction the actual thickness of the condensers, when cooled down from the pressing temperature, is less than the thickness to which they are compressed in the press. Fig. 9 gives the contraction for condensers of various total thicknesses. To obtain the proper distance of the press stops, the contraction has to be added to the required thickness of the condenser.

It should be well understood that the given thicknesses and break-down voltages given in the above test results represent average values, the variation from these values being, however, within the limits permitted in tests of this kind.

It should be also understood that the above given values, representing results obtained with a paper of medium quality and commercial paraffin are merely given for the sake of illustration. With a higher grade paper and improved dielectric or with special treatment of the material or special methods of impregnation and treatment of the condensers, condensers of standard make may show higher dielectric strength than given in the above tests. If the invention is applied to such condensers the dielectric strength is again raised in the same manner as disclosed above.

In the previous discussion of my invention I have referred, for the sake of simplicity, to the interposed dielectric layers as having all identical thickness and dielectric strength. In practice, however, it appears that the paraffin layers formed between two paper layers are of somewhat greater thickness and of a considerably higher dielectric strength than the paraffin layers between a paper layer and an adjoining metal foil. The direct result thereof is that in case my invention is applied, for instance, to three-paper layer condensers—instead of two-paper layer condensers—the increase in break-down voltage is considerably larger than would result merely through the fact of increasing the number of interposed layers from three to four, as the additional paraffin layer of the three-paper layer condenser is formed between two paper layers. The same holds if my invention is applied to four or more paper layer condensers.

To understand the importance of my invention it should be kept in mind that in the past, to increase the break-down voltage of condensers, multiplication of the number of paper layers was required. For instance, in the case of using materials as specified in connection with the above tests, standard three and four-paper layer condensers have break-down voltages of approximately 1400 volts and 2100 volts, respectively. As appears from the curves of Fig. 6, I am able to obtain the same break-down voltages with two-paper layer condensers by interposing paraffin layers of .000025" and .000085" thickness, respectively, or making the total thickness of the condenser .229" and .258", (see points P1, P1' and P2, P2' of the curves of Fig. 6.) From this it can be seen that two-paper layer condensers embodying my invention can successfully take the place of commercial three and four layer condensers. This results in an extraordinary high saving in the amount of paper and metal foil used. For instance, it was found that the combined weight of paper and aluminum foil of a certain type of three-paper layer condenser made according to standard practice was 2.3 oz. per microfarad and that of the equivalent two-paper layer condenser embodying my invention only 1.38 oz. per microfarad. The corresponding values for a standard four-paper layer condenser and the equivalent condenser of my make were 3.8 and 1.67 oz. per microfarad, respectively. It should be noted that the weights are given per microfarad and that, therefore, the slight increase of material required in my condensers compared with fully compressed two-paper layer condensers has been taken into account in the above comparative figures. The same comparative figures also hold closely for the reduction in cost of material and in volume when standard make three and four-layer paper condensers are substituted by two-paper layer condensers embodying my invention.

In the same way, by applying my invention to three-paper layer condensers, these can take the place of five and six-paper layer condensers of standard make or by applying it to four or more paper layer condensers, breakdown voltages of such magnitudes can be obtained which have been so far regarded as wholly unfeasible.

While I have described and illustrated my invention in connection with certain physical embodiments and particularly as applied to paraffined paper condensers, and while I have shown a preferred method for obtaining the desired thin dielectric layers, it should be well understood that my invention is not limited to such showing and description. For instance, various materials may be used for the thin interposed dielectric layers or for the impregnating medium. Good results, for example, have been obtained with ceresin, halowax and other similar materials. Synthetic phenolic rosin and various other known dielectric materials can also be successfully used. It should be also understood that the proper temperature and the thickness of the layers varies for various dielectrics, primarily according to the solidification point and viscosity. The number of paper layers, as has been stated, may be varied. The paper may be omitted altogether or may be substituted by other fibrous materials. The thin dielectric layers may be interposed in the assembled condensers by other methods than the one described, or the dielectric layers may be applied to the paper or similar layers before the condensers are assembled.

The foregoing detailed description has been given for clearness of understanding, and no undue limitations should be deduced therefrom but the appended claims should be construed as broadly as possible in view of the prior art.

This application is a continuation in part of my application Ser. No. 135,342, filed September 14, 1926, and a continuation in part of my application Serial No. 266,921, filed April 3, 1928.

I claim:

1. In an electric condenser layers of conducting material and layers of dielectric material interposed between said layers of conducting material, said dielectric layers comprising alternate layers of paraffin-impregnated paper and of paraffin, said paraffin layers having a substantially uniform thickness throughout the condenser, said thickness falling within a range of .00003 to .00017 inch.

2. An electrical condenser comprising metal foils and layers of dielectric material interposed between said metal foils and forming therewith a roll, said dielectric layers comprising layers of paraffin-impregnated paper and layers of paraffin, said paraffin layers being interposed between said paraffin-impregnated paper layers and being throughout the condenser of a thickness falling within the range of .00003 to .00017 inch.

ROBERT C. SPRAGUE.